(12) United States Patent
Ahopelto et al.

(10) Patent No.: US 7,577,433 B2
(45) Date of Patent: Aug. 18, 2009

(54) METHOD AND SYSTEM FOR MANAGING DELIVERY OF COMMUNICATIONS

(75) Inventors: Timo Ahopelto, Helsinki (FI); Timo Romppanen, Helsinki (FI); Marko Ahtisaari, Helsinki (FI); Ismo Antikainen, Masala (FI)

(73) Assignee: Cvon Innovations Limited, London (GB)

( * ) Notice: Subject to any disclaimer, the term of this patent is extended or adjusted under 35 U.S.C. 154(b) by 0 days.

(21) Appl. No.: 12/080,940

(22) Filed: Apr. 7, 2008

(65) Prior Publication Data

US 2008/0312996 A1  Dec. 18, 2008

Related U.S. Application Data

(60) Provisional application No. 60/936,094, filed on Jun. 18, 2007.

(51) Int. Cl.
*H04W 4/00* (2009.01)
(52) U.S. Cl. .......................... 455/432.1; 706/1; 706/14; 379/114.01; 379/114.1; 379/114.13
(58) Field of Classification Search .................. 455/432
See application file for complete search history.

(56) References Cited

U.S. PATENT DOCUMENTS

| | | | |
|---|---|---|---|
| 5,678,179 | A | 10/1997 | Turcotte et al. |
| 6,097,942 | A | 8/2000 | Laiho |
| 6,556,817 | B1 * | 4/2003 | Souissi et al. ............... 455/406 |
| 6,647,269 | B2 | 11/2003 | Hendrey et al. |
| 6,718,178 | B1 | 4/2004 | Sladek et al. |
| 6,889,054 | B2 | 5/2005 | Himmel et al. |
| 6,920,326 | B2 * | 7/2005 | Agarwal et al. ............. 455/445 |
| 7,072,947 | B1 | 7/2006 | Knox et al. |
| 2001/0008404 | A1 | 7/2001 | Naito et al. |
| 2002/0032771 | A1 | 3/2002 | Gledje |
| 2002/0128908 | A1 | 9/2002 | Levin et al. |
| 2003/0003929 | A1 | 1/2003 | Himmel et al. |
| 2003/0110171 | A1 | 6/2003 | Ozer et al. |
| 2004/0158612 | A1 | 8/2004 | Concannon |
| 2004/0203761 | A1 * | 10/2004 | Baba et al. .................. 455/433 |

(Continued)

FOREIGN PATENT DOCUMENTS

EP    0985309 B1    3/2000

(Continued)

OTHER PUBLICATIONS

United Kingdom Search Report under Section 17 dated Mar. 10, 2008 of corresponding U.K. Application No. GB0721921.5.

(Continued)

*Primary Examiner*—Rafael Pérez-Gutiérrez
*Assistant Examiner*—German Viana Di Prisco
(74) *Attorney, Agent, or Firm*—Frishauf, Holtz, Goodman & Chick, P.C.; Robert P. Michal

(57) ABSTRACT

Method and system for managing delivery of communications such as advertisements to mobile telephone subscribers where delivery to roaming subscribers is prevented or blocked when the subscriber is determined to be using a roaming network and revenue derived from delivery of the advertisements to a roaming subscriber is less than the cost for delivering the advertisements to the roaming subscribers.

28 Claims, 2 Drawing Sheets

U.S. PATENT DOCUMENTS

| | | | |
|---|---|---|---|
| 2005/0021853 A1 | 1/2005 | Parekh et al. | |
| 2005/0027676 A1 | 2/2005 | Eichstaedt et al. | |
| 2005/0055408 A1 | 3/2005 | Dong | |
| 2005/0148350 A1 | 7/2005 | Kamphuis | |
| 2005/0186940 A1 | 8/2005 | Schatzberger et al. | |
| 2006/0025163 A1 | 2/2006 | Smith et al. | |
| 2006/0041470 A1 | 2/2006 | Filho et al. | |
| 2006/0094406 A1 | 5/2006 | Cortegiano | |
| 2006/0109969 A1 | 5/2006 | Oh | |
| 2006/0206586 A1* | 9/2006 | Ling et al. | 709/219 |
| 2006/0253327 A1 | 11/2006 | Morris et al. | |
| 2007/0004380 A1 | 1/2007 | Ylikoski | |
| 2007/0016488 A1 | 1/2007 | Ulenas | |
| 2007/0033104 A1 | 2/2007 | Collins et al. | |
| 2007/0047523 A1* | 3/2007 | Jiang | 370/352 |
| 2007/0088801 A1* | 4/2007 | Levkovitz et al. | 709/217 |
| 2007/0093202 A1* | 4/2007 | Hwang et al. | 455/3.06 |
| 2007/0117571 A1* | 5/2007 | Musial | 455/456.1 |
| 2007/0149208 A1* | 6/2007 | Syrbe et al. | 455/456.1 |
| 2007/0237330 A1 | 10/2007 | Srivastava | |
| 2008/0032703 A1* | 2/2008 | Krumm et al. | 455/456.1 |
| 2008/0070579 A1* | 3/2008 | Kankar et al. | 455/445 |
| 2008/0215744 A1* | 9/2008 | Shenfield | 709/231 |

FOREIGN PATENT DOCUMENTS

| | | |
|---|---|---|
| EP | 1 073 293 A1 | 1/2001 |
| EP | 1 161 093 A2 | 12/2001 |
| EP | 1 193 955 A2 | 4/2002 |
| EP | 1 239 395 A2 | 9/2002 |
| EP | 1 253 542 A2 | 10/2002 |
| EP | 1 298 945 A1 | 4/2003 |
| EP | 1 324 250 A1 | 7/2003 |
| EP | 1 365 604 A2 | 11/2003 |
| EP | 1 445 703 A1 | 8/2004 |
| EP | 1 613 102 A1 | 1/2006 |
| GB | 2 352 856 A | 2/2001 |
| GB | 2 356 777 A | 5/2001 |
| GB | 2 383 149 A | 6/2003 |
| GB | 2 407 002 A | 4/2005 |
| JP | 2002/140272 | 5/2002 |
| WO | WO 97/33421 | 9/1997 |
| WO | WO 00/62564 | 10/2000 |
| WO | WO 01/22748 A1 | 3/2001 |
| WO | WO 01/55892 A1 | 8/2001 |
| WO | WO 01/69406 A1 | 9/2001 |
| WO | WO 01/77840 A1 | 10/2001 |
| WO | WO 01/78425 A1 | 10/2001 |
| WO | WO 01/97539 A2 | 12/2001 |
| WO | WO 02/23423 A1 | 3/2002 |
| WO | WO 02/31624 A2 | 4/2002 |
| WO | WO 02/44834 A2 | 6/2002 |
| WO | WO 02/059720 A2 | 8/2002 |
| WO | WO 02/080595 A1 | 10/2002 |
| WO | WO 02/084895 A1 | 10/2002 |
| WO | WO 03/015430 A1 | 2/2003 |
| WO | WO 03/038638 A1 | 5/2003 |
| WO | WO 2004/034671 A1 | 4/2004 |
| WO | WO 2004/054205 A1 | 6/2004 |
| WO | WO 2004/086791 A1 | 10/2004 |
| WO | WO 2004/114109 A1 | 12/2004 |
| WO | WO 2005/015806 A2 | 2/2005 |
| WO | WO 2005/062637 A1 | 7/2005 |
| WO | WO 2005/083980 A1 | 9/2005 |
| WO | WO 2005/086927 A2 | 9/2005 |
| WO | WO 2006/026505 A2 | 3/2006 |
| WO | WO 2006/110446 A1 | 10/2006 |
| WO | WO 2007/056698 A2 | 5/2007 |

OTHER PUBLICATIONS

Communication (Search Report) mailed Mar. 5, 2009 issued from the European Patent Office in related European Application Serial No, 08158523.4 (3 pages).

Notification of Transmittal of The International Search Report and the Written Opinion of the International Searching Authority mailed Mar. 18, 2009 in related PCT International Application No. PCT/EP2008/057728 (1 page).

International Search Report mailed Mar. 18, 2009 in related PCT International Application No. PCT/EP2008/057728 (4 pages).

Written Opinion of the International Searching Authority) mailed Mar. 18, 2009 issued from the International Searching Authority in related PCT International Application No. PCT/EP2008/057728 (6 pages).

Communication Pursuant to Article 94(3) EPC mailed Mar. 24, 2009 issued from the European Patent Office in related European Application Serial No. 08 158 523.4 (4 pages).

* cited by examiner

METHOD AND SYSTEM FOR MANAGING DELIVERY OF COMMUNICATIONS

CROSS-REFERENCE TO RELATED APPLICATIONS

This application claims the benefit of the filing dates of U.S. Provisional Patent Application Ser. No. 60/936,094 filed Jun. 18, 2007 and UK Patent Application GB0721921.5 filed Nov. 8, 2007, the entire disclosure of each of which is incorporated by reference herein.

FIELD OF THE INVENTION

The present invention relates generally to methods and systems for managing delivery of communications to mobile devices and more particularly to methods and systems for managing delivery of messages and advertisements to subscribers of a mobile telephone operator.

BACKGROUND OF THE INVENTION

Usage of cellular or mobile telephones is very popular and common. In a typical arrangement for use of a mobile telephone, a user subscribes to a mobile telephone service offered by a mobile telephone operator or carrier and enters into, for example, a pre-paid or post-paid plan with the mobile telephone operator. A pre-paid subscription plan is usually an arrangement where the user pays in advance for the telephone services to be used over a future period of time. A post-paid subscription plan is usually an arrangement where the user pays for the telephone services after using the services.

The services available using the mobile telephone may be voice services (i.e., making and receiving telephone calls), messaging services such as Short Message Service (SMS), Multimedia Message Service (MMS), data services such as Internet browsing or Wireless Application Protocol (WAP) browsing, video calls, downloading content, streaming content, purchasing applications such as games or other software, using location, guidance or navigation services, finding information, and communicating with a group of people and others.

The popularity of mobile telephones has also enabled their use, along with related infrastructure, as a media for providing mobile marketing, i.e., advertisements to the users of the telephones.

An issue arises when advertisements of a mobile marketing campaign are sent to the mobile telephones of subscribers who are not using their home communications network operated by the mobile telephone operator, e.g., they are using a roaming network such as an international roaming network. Often, the roaming charges for sending the advertisement which are typically paid by the mobile telephone operator are higher than the mobile telephone operator's revenue from the delivery of the advertisement, which is paid by the advertiser. Although a Home Location Register (HLR) managed by the mobile telephone operator indicates the subscriber's roaming status, it does not affect the communications to the subscriber and therefore does not prevent the forwarding of the advertisements to the roaming subscriber.

SUMMARY OF THE INVENTION

The present invention is directed at least in part to a method and system for managing delivery of communications such as advertisements to a mobile telephone subscriber where delivery of the communications or advertisements to a roaming subscriber, such as an internationally roaming subscriber, is prevented or blocked.

In one embodiment, delivery of advertisements to an internationally roaming subscriber is prevented or blocked by ascertaining the roaming status of the subscriber using the HLR, maintaining this roaming status in an advertisement delivery gateway, comparing revenue to be derived from delivery of the advertisements with roaming charges prior to delivering advertisements to subscribers, and deciding whether to deliver the advertisements to the subscriber based on the revenue comparison.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
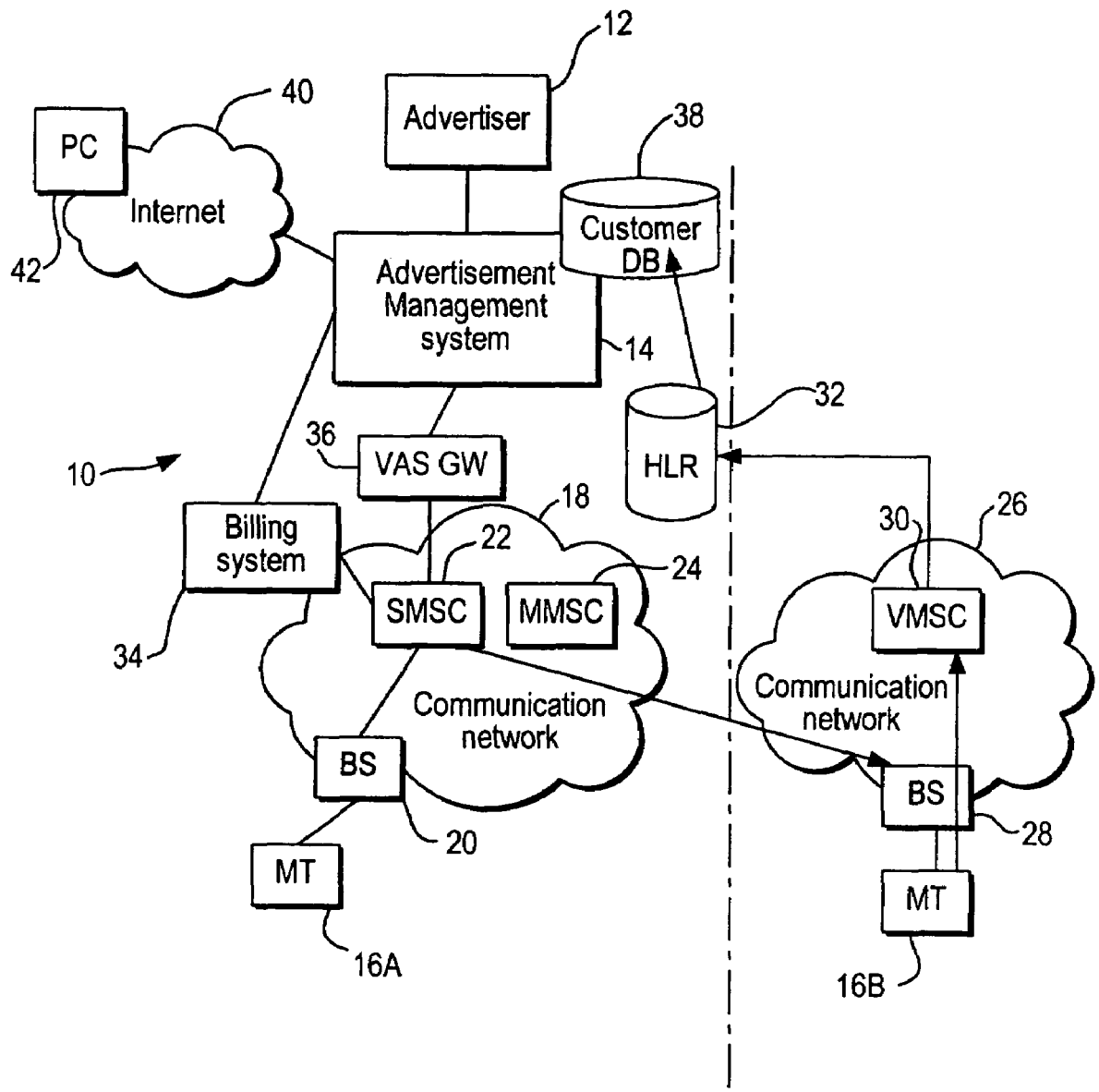
FIG. 1 is a schematic of an exemplifying architecture of an advertisement system in accordance with the invention.

Referring to the accompanying drawings wherein the same reference numerals refer to the same or similar elements, FIG. 1 shows an architecture of an embodiment of a mobile telephone advertising management system in accordance with the invention which is designated generally as 10. System 10 may be implemented to provide subsidized or even free mobile telephones services, the subsidy being provided by advertisers whose advertisements are being directed to subscribers of the mobile telephone service.

The system 10 includes one or more advertisers 12, defined to include any and all entities or individuals that want to advertise products or services to customers participating in the mobile marketing arrangement, and an advertisement management system 14 that is operated by, for example, an advertising delivery company.

Advertisers 12 can thus refer to a brand owner, a service provider, an advertisement agent, a merchant or any other party that wants to provide advertisements to consumers. Advertisements can be commercial, such as a product or service promotion, or non-commercial, such as a general information service notification.

Typically, the operator of the advertisement management system 14 is a company in the business of delivering advertisements from several advertisers, i.e., it is the intermediary between advertisers and the operators of the advertisement distribution channels. Operation of the advertisement management system 14 is typically managed over an Internet interface, but other systems of operation are foreseen.

The advertisement management system 14 preferably includes tools for each advertiser to define rules of their advertisement campaign, i.e., to enable them to tailor the advertisement campaign to their specific desires. This may include reserving, programming and/or booking an advertising campaign via an Internet interface. Parameters which are determined include, but are not limited to, the time period or periods when to send advertisements, the duration of the advertising campaign, the target group or groups, demographics of the target group(s), the format or type of advertisement, the target price level or cost per advertisement or for the advertising campaign in its entirety, the sociological background of the target audience, demographics of the target group(s) including, for example, age, sex and income level(s), target telephone type, etc. In addition to determining the rules, each advertiser 12 typically provides one or more actual advertisements in the form of data, text, pictures, video, audio, html-documents, links, television content, videos, HTML, xHTML, WAP pages, web pages, etc., or any digital content compatible for reception and display by the users' mobile terminals 16A, 16B.

An advertisement can be delivered to the users' mobile terminals 16A, 16B via a communications network 18. The communications network 18 may be any cellular, broadcast, wide area, local area or Internet network. For example, FIG. 1 shows a typical layout of a cellular communications network 18 including one or more base stations (BS) 20, a Short Message Service Center (SMSC) 22 and a Multimedia Message Service Center (MMSC) 24. Communications network 18 can also be a combination of different communications networks such as a Wireless Local Area Network (WLAN) and a Wideband Code Division Multiplex (WCDMA) network.

Communications network 18 can utilize any cellular network technologies which include, but are not limited to, GSM, WCDMA, CDMA, GPRS. In addition to traditional cellular networks, local area networks such as Wireless Local area networks (WLAN), BlueTooth (BT) and other technologies such as WiMax, Broadcasting over DVB-H, ISDB-T, DMB or broadcasting over cellular can be used to deliver advertisements. The communications network 18 can also be a generic Internet access network using any data transport methods. Using the foregoing networks, the advertisements from advertisers 12 can be SMS, MMS, WAP Push, Web pages, or any digital object.

Subscribers to the mobile telephone operator using the mobile terminals 16A, 16B can use the same communications network or another communications network as the communications network 18 being used to deliver advertisements from advertisers 12 via the advertisement management system 14, i.e., a hybrid network is possible. In a preferred embodiment, the communications network 18 is a cellular network and the users' mobile terminals 16A, 16B are mobile devices such as a mobile telephone, a multimedia computer, a multimedia communication device, a PDA or a laptop computer.

The communications network 18 can be considered as the home communications network of the users of the mobile terminals 16A, 16B. At times, for example, when a user's mobile terminal 16B is unable to access the home communications network 18, the user's mobile terminal 16B must access a roaming communications network 26. Roaming network 26 is any non-home communications network where the user's mobile terminal cannot access the home communications network 18, for example, when the user is visiting a place not covered by home communications network 18. A common example of this situation is a mobile telephone service subscriber who visits a foreign country and accesses mobile telephone services in the foreign country using a local network in that country.

When the user's mobile terminal 16B accesses roaming network 26, transmissions for mobile terminal 16B are sent via a base station 28 of this roaming network 26 from the SMSC 22 of the home communications network 18, when the transmission is a SMS. In the roaming network 26, there may often be a Visited Mobile Switch Center (VMSC) 30 which provides location updates of the visiting mobile user to a Home Location Register (HLR) 32 of the home communications network 18.

When the user of mobile terminal 16B uses roaming network 26, there is typically a different, higher cost incurred to send and receive communications, in contrast to use of the home communications network 18 by the same user. The higher cost is for the sending and receiving of most if not all communications including messages such as marketing messages sent from the advertisement management system 14 to the mobile terminal 16B. Other than marketing messages from advertisement management system 14, communications to and from the user of mobile terminal 16B which incur a higher cost may be those to or from any other user and/or computer system, regardless of the form of the communication, i.e., voice, messaging, data and the like.

As shown in FIG. 1, arrangement 10 also includes a billing system 34 coupled to the advertisement management system 14 and/or the communications network 18 or specific parts thereof, i.e., the SMSC 22 as shown in FIG. 1, and may be arranged to monitor and/or meter usage of the communications network 18 by each mobile terminal 16A, 16B and monitor and/or meter usage and payments of or for the advertisements being delivered to each mobile terminal 16a, 16B by the advertisement management system 14. The billing system 34 may be a real-time billing system or a close-to-real-time billing system. The billing system 34 or other suitable means associated with the arrangement 10 can thus arrange for payment from users of the mobile terminals 16A, 16B based on their usage of the communications network 18. Usage of the communications network 18 may entail voice services, messaging services (Short Message Service, Multimedia Message Service, Instant Message Service, Electronic mail services), video telephony services, push-to-talk services, data services such as Internet or Wireless Application Protocol (WAP) browsing services, content usage (television, radio, video) services, download services, among others.

In one embodiment of the invention, billing system 34 meters usage of the services by each user and compares the metered usage with a free or subsidized balance allocated to each user. In this manner, although invoices are not sent to the users, the metered usage is compared with business rules associated with the users and the cost for providing the free or subsidized services to the users is invoiced directly or indirectly from advertisers. Other techniques to provide subsidized or free telephone services to the users are also envisioned.

Arrangement 10 includes a Value Added Service Gateway (VAS GW) 36 that connects communications network 18, or some of the elements thereof such as the SMSC 22 as shown, to the advertisement management system 14. The VAS GW 36 can also be connected to the billing system 34.

Advertisement management system 14 includes a database 38 containing information such as profiles of the users of the mobile terminals 16A, 16B and a set of parameters or rules, and preferences of the users relating, for example, to delivery of advertisements and other messages to the users. An interface to the database 38 can be provided to enable users to modify one or more of their associated delivery parameters, for example, a web interface which enables management of the database 38 via the Internet 40. Typically, this can be done with a personal computer 42 or a mobile telephone which has a Web or Wireless Application Protocol (WAP) browser and an Internet (or WAP) connection. More specifically, the user is enabled to adjust the delivery parameters by means of a computer program in the advertisement management system 14 which manages the database 38 and provides the user interface. Additional details about the computer program are set forth below.

The HLR 32 monitors the communications network which the user's mobile telephone is using, i.e., provides an indication of which communications network the user's mobile telephone is using such as communications network 18 or communications network 26 in the embodiment shown in FIG. 1. There are other systems which perform the same function as the HLR and these other network-determining or monitoring systems are also envisioned to be within the scope and spirit of the invention.

In use, the HLR 32 or other monitoring system would be programmed to trigger roaming status to the advertisement management system 14, i.e., notify the advertising management system 14 that the user's mobile terminal 16B is not communicating using communications network 18 and thus roaming using another operator's communications network. The triggering of the advertisement management system 14 or status notification provided by the HLR 32 may be an indication whether the user is roaming or not, an identification of the location or country in which the user is roaming (which may be made based on the communications network the user is using) and/or an identification of the operator whose communications network the roaming user is using to communicate.

In one embodiment, when the HLR 32 triggers the advertisement management system 14 that the user is roaming, this may be used by a computer program in the advertisement management system 14 to consider whether or not to direct an advertisement message to the user. There may be several conditions that must be satisfied in order to allow an advertisement message to be directed to the user when roaming.

One is that the advertisement management system 14 is not set to prevent advertisement messages from being sent to users when roaming. That is, the advertisement management system 14 may be arranged to prevent delivery of advertisement messages to users when roaming without considering other factors, such as a revenue comparison described below. In this case, a determination would be made not to direct an advertisement message to user in view of the user's roaming status, and the advertisement management system 14 may then direct a message to the VAS GW 36 causing it to stop sending advertisements to the user's mobile terminal 16B as long as the user is roaming.

Another condition for the delivery of the advertisement is that there is at least one advertiser that has allowed for delivery of advertisements to users not using the home communications network, i.e., roaming users. If there are no such advertisers, the communications to the roaming user will either not be subsidized or not permitted.

Another condition for the delivery of the advertisement may be the existence of a favorable revenue comparison. That is, the computer program in the advertisement management system 14 may be arranged to send a message to the billing system 34 when a user is determined to be roaming (using a communications network other than their home communications network 18) to inform the billing system 34 about the roaming for the purpose of, for example, determining the cost of delivering an advertisement to the roaming user.

In one embodiment, the revenue derived from the delivery of the advertisement to the user when the user is roaming is determined and compared to the cost for delivering the advertisement to the roaming user. This comparison may be performed by a computer program resident in the billing system 34 or in the advertisement management system 14. If the revenue derived from the delivery of the advertisement to the user when the user is roaming is less than the cost for delivering the advertisement to the roaming user, then the advertisement management system 14 may prevent the delivery of the advertisement, e.g., by directing a message to the VAS GW 36.

The billing system 34 may be arranged to bill advertisers for delivery of advertisements to users at different rates depending on the roaming status of the users. For example, a computer program in the billing system 34 may determine a subsidized rate for delivery of an advertisement to a user using their home communications network while there would be a non-subsidized rate or higher rate when the user is roaming using another operator's communications network. The billing system 34 would therefore need to know whether the user is roaming in order to determine the appropriate billing for delivery of an advertisement to a user.

Another condition for the delivery of the advertisement to a roaming user is whether the delivery has been permitted by the user by setting their delivery parameters. This feature is discussed in greater detail in the application by the same inventors as the present application entitled Method and System for Managing Delivery of Communications filed on the same date as the present application, the entire disclosure of which is incorporated herein by reference.

As discussed above, the advertisement management system 14 includes a computer program which enables users to define parameters and preferences for delivery of any communications addressed to them, in particular when roaming. For example, the user could use the interface to the computer program at the advertisement management system 14 to indicate permitted senders of messages, i.e., indicate a desire to receive messages from a list of certain persons, and also indicate non-permitted senders, i.e., indicate a desire to block reception of messages from others (whether specified or unspecified). This procedure could alternatively or additionally include setting up a permission indicator to receive other types of communications such as telephone calls from a list of certain persons or entities while similar communications from others are blocked. Alternatively or additionally, this procedure could entail setting up a list of data or other types of services which can be accessed when roaming.

Figure 2:
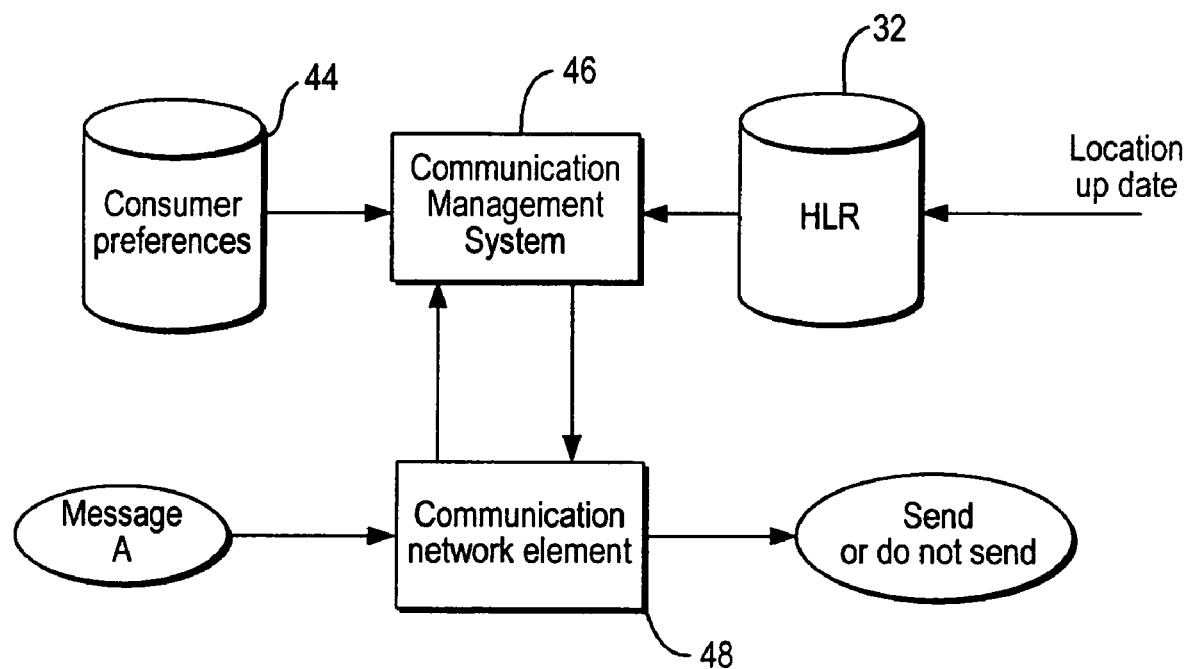
FIG. 2 is a schematic of a communications arrangement for use in an advertisement system and method in accordance with the invention.

FIG. 2 shows a diagram of exemplary communication management software which may be resident in the advertisement management system 14, or in a separate server connected thereto. Using the software, each user inputs their preferences vis-à-vis reception of communications 44. A communications management system 46 receives the user's preferences from 44 and information about the communications network the user is using from the HLR 32. Based on the user's preferences and the communications network the user is using, the communications management system 46 determines whether or not a message A is to be delivered to the user.

A communication network unit 48 receives message A which informs the communication management system 46 of the message origin and target and/or sends message A and its origin and target to the communication management system 46. The communication management system 46 generates a control message to the communication network unit 48 to allow delivery of the message A to the user or to block such delivery. Blocked messages may be stored in the communication network unit 48 or/and in the communications management system 46, for example, until such time as the user is no longer roaming and is using the home communications network.

Message A, whose delivery is controlled by communications management system 46, can be any type of communicable message capable of being delivered to a mobile device, including but not limited to the following: an SMS message, an MMS message, an WAP push message; a data call, a voice call, a video call, music streaming, video streaming, an advertisement message, a marketing message, a message from a group of people, a message to group of people, a message from an individual person, a message to an individual person, a message from a computer system or systems, and a message to a computer system or systems. Message A can be also a message to a roaming network or from a roaming network.

Several computer programs resident on computer-readable media may be used in the invention. One computer program is resident in the advertisement management system 14 and manages delivery of communications to users' mobile devices, in particular advertisements. The computer program enables users to manage parameters and preferences for delivery of communications to their mobile devices, maintains the parameters and preferences managed by the users in a database, and upon receiving a request to deliver communications to the users, checks the database to ascertain whether the users have permitted or blocked the delivery of such communications. If such communications have been blocked, they will not be delivered.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

The parameters and preferences relating to the delivery of communications may include indications to allow or block specific types of communications and communications from specific sources, as well as indications to allow or block specific types of communications and communications from specific sources when the user is not using their home communications network, i.e., the user is using a roaming network, oe even when the user is located in the home communication network but does not want to receive certain types of communications. Different preferences may be created depending on whether the user is roaming or not. As such, each user can allow or block delivery of specific types of communications such as advertisements when roaming, or allow or block communications from specific sources when roaming.

In one embodiment, the computer program enables the users to manage their parameters and preferences using an Internet interface. For example, the computer program may be arranged to present each user with a display on a screen of their computer including a list of senders of communications and allow the user to indicate whether they want to accept or block communications from these senders. Also, a list of different types of communications can be displayed and the user provided with means to allow them to indicate whether they want to accept or block these types of communications. Each user can manage their lists as they desire, e.g., add senders to the lists.

In addition to or instead of the enabling users to set parameters and preferences for delivery of communications to their mobile devices when roaming or otherwise, the computer program may automatically manage delivery of communications to the users based on which communications network they are using. This may be determined by a network-usage determining system, such as a home location register, with the database containing data about the users and an indication of the communications network the users are using. The computer program may manage the network-usage determining system and thus determine which communications network each user is using.

The database may be maintained by the computer program itself or maintained by another computer program and accessed by the computer program. Thus, whenever a request to deliver a communication to a user is received, a determination is made whether to deliver communications to the user by checking the database to ascertain which communications network the user is using and allowing or preventing delivery of communications to the user based on which communications network they are using. Analysis of the type of communication may also be made to prevent delivery of some types of communications, such as advertisements, while allowing delivery of other types of communications, such as service messages.

In this regard, the computer program could associate a communications network as each user's home communications network and other networks as roaming networks and prevent delivery of communications to users using a roaming network. The database could therefore contain an indication of each user's home communications network. This feature would be useful in a situation where the users receive mobile telephone services at a subsidized cost or free in exchange for receiving advertisements, and the cost to deliver the advertisements to users using a roaming network is greater than the revenue gained by the mobile telephone service operator for delivery the advertisement to the user.

The foregoing enables innovative and focused mobile marketing and advertising. This is important because such a concept is considered by advertisers as the next new channel to directly reach consumers since it utilizes core assets and characteristics of the mobile media, namely, it is personal in that it is directed solely to individual consumers, it is "always on" and can reach the consumers whenever they access their communications devices, it is mobile and naturally forms groups of people who communicate actively with each other. These characteristics combined with social networks-based approaches of the Internet could form a very powerful base to execute marketing strategies.

In general, mobile marketing and advertising can be divided into the following four categories: mobile marketing, mobile advertising, mobile direct marketing and mobile customer relation management (CRM). The present invention in any of its forms discussed above is applicable to all categories.

Mobile marketing is commonly considered as the systematic planning, implementing and control of a mix of business activities intended to bring together buyers and sellers for the mutually advantageous exchange or transfer of products or services where the primary point of contact with the consumer is via their mobile device.

Mobile advertising is commonly considered as the paid, public, non-personal announcement of a persuasive message by an identified sponsor as well as the non-personal presentation or promotion by a firm of its products to its existing and potential customers where such communication is delivered to a mobile telephone or other mobile device. Examples of mobile advertising include: Wireless Application Protocol (WAP) Banner ads, mobile search advertising, mobile video bumpers, and interstitial ads in or on device portals.

Mobile direct marketing is commonly considered a sales and promotion technique in which promotional materials are delivered individually to potential customers via the potential customer's mobile telephone or other mobile device. Examples of mobile direct marketing include the sending of Short Message Service (SMS), Multimedia Message Service (MMS) or Wireless Application Protocol (WAP) push messages, Bluetooth messaging and other marketing to mobile telephones or other mobile devices.

Mobile customer relation management is commonly considered as a combination of all the foregoing in a manner that establishes a long-term, engaging relationship between the customer and the marketing or promoting company.

At present, mobile marketing and advertising is mostly based on push campaigns to opt-in a consumer mobile number in a database, or pull campaigns that acquire mobile telephone numbers from consumers. The most typical example of the pull campaign is the "text-to-win" campaign where, e.g., a soft drink bottle contains a short code to be sent via text message to a certain telephone number. In return, the consumer receives a notification if they have won with the selected marketing message, or a series of messages is broadcast to their mobile telephone. Other popular methods of direct advertisement are achieved using text and video messaging.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. A method for managing delivery of communications from a plurality of content providers to at least one user of a mobile communications device, comprising:
    determining a communications network being used by a user;
    determining whether the communications network being used by the user is a home communications network or a roaming network;
    identifying a prespecified delivery parameter of at least one of the plurality of content providers based on the determination of whether the communications network being used by the user is a home communications network or a roaming network, each of the plurality of content providers having respective prespecified delivery parameters, wherein a respective delivery parameter is specified by a respective content provider and the user is required to receive or be available to receive communications from at least one of said plurality of content providers;
    selectively delivering communications to the user based on the identified prespecified delivery parameter, wherein the communications delivered to the user comprise content from at least one of said plurality of content providers;
    deriving available resource usage from resource usage allocated by the at least one of said plurality of content providers for delivery of communications to the user; and
    comparing the available resource usage to resource usage required for delivering such communications,
    wherein the step of selectively delivering communications to the user comprises managing delivery of communications based on the comparison of the available resource usage and the resource requirement for delivering communications to the user using a roaming network.

2. The method of claim 1, further comprising:
    determining a location of the user based on the communications network the user is using; and
    maintaining location information about the user in a database,
    the step of selectively delivering communications to the user comprising accessing the database to determine the location of the user and managing the delivery of communications based on the location of the user.

3. The method of claim 1, wherein the step of selectively delivering communications to the user comprises preventing delivery of communications to the user if it is determined that the user is using a communications network different than the home communications network.

4. The method of claim 1, wherein the step of selectively delivering communications to the user further comprises preventing delivery of communications to the user using a roaming network when the required resource usage for delivery of the communications exceeds the available resource usage.

5. The method of claim 1, further comprising providing the communication services to the user in exchange for a requirement that the user receive communications.

6. The system of claim 1, wherein the content delivered to the user comprises at least one of an SMS message, an MNS message, a WAP push message, a data call, a voice call, a video call, music streaming, video streaming, an advertising message, and a marketing message.

7. The system of claim 1, wherein the available usage corresponds to monetary resources of the at least one of the plurality of content providers for delivery of communications to the user.

8. A system for managing delivery of communications from a plurality of content providers to at least one user of a mobile communications device, comprising:
    means for determining a communications network being used by a user;
    means for determining whether the communications network being used by the user is a home communications network or a roaming network;
    means for identifying a prespecified delivery parameter of at least one of the plurality of content providers based on the determination of whether the communications network being used by the user is a home communications network or a roaming network, each of the plurality of content providers having respective prespecified delivery parameters, wherein a respective delivery parameter is specified by a respective content provider and the user is required to receive or be available to receive communications from at least one of said plurality of content providers;
    means for selectively delivering communications to the user based on the identified prespecified delivery parameter wherein the communications delivered to the user comprise content from at least one of said plurality of content providers;

means for deriving available resource usage from resource usage allocated by the at least one of said plurality of content providers for delivery of communications to the user; and means for comparing the available resource usage to resource usage required for delivering such communications, wherein the means for selectively delivering communications to the user comprises means for managing delivery of communications based on the comparison of the available resource usage and the resource requirement for delivering communications to the user using a roaming network.

9. The system of claim 8, further comprising:

means for determining a location of the user based on the communications network the user is using; and a database in which location information about the user is maintained, said means for selectively delivering communications to the user being arranged to access said database to determine the location of the user and manage the delivery of communications based on the location of the user.

10. The system of claim 8, wherein said means for selectively delivering communications to the user is arranged to prevent delivery of communications to a user determined to be using a communications network in a country different than the home communications network.

11. The system of claim 8, further comprising means for comparing available resource usage to resource usage for delivery of communications to a user using a roaming network, said means for selectively delivering communications to the user being arranged to prevent delivery of communications to a user using a roaming network when the required resource usage for delivery of the communications exceeds the available resource usage.

12. The system of claim 8, wherein the available resource usage is derived from resource usage allocated by the at least one of the plurality of content providers, the system further comprising means for reducing the allocated resource usage at different rates depending on the communications network being used by the user when receiving the communications.

13. The system of claim 8, wherein the content delivered to the user comprises at least one of an SMS message, an MMS message, a WAP push message, a data call, a voice call, a video call, music streaming, video streaming, an advertising message, and a marketing message.

14. The system of claim 8, wherein the available usage corresponds to monetary resources of the at least one of the plurality of content providers for delivery of communications to the user.

15. A system for managing delivery of communications from a plurality of content providers to at least one user of a mobile communications device, comprising:

a communications management system arranged to receive communications from the plurality of content providers for delivery to the user wherein the communications delivered to the user comprise content from at least one of said plurality of content providers;

a determining system which determines the communications network being used by the user;

a database coupled to said determining system and said communications management system, said database containing data about the communications network being used by the user as determined by said determining system and providing the data to said communications management system;

a deriving system which derives available resource usage from resource usage allocated by the at least one of said plurality of content providers for delivery of communications to the user; and a comparator system which compares the available resource usage to resource usage required for delivering such communications, wherein selectively delivering communications to the user comprises managing delivery of communications based on the comparison of the available resource usage and the resource requirement for delivering communications to the user using a roaming network, said communications management system being arranged to identify a prespecified delivery parameter of at least one of the plurality of content providers based on the determination of whether the communications network being used by the user is a home communications network or a roaming network, each of the plurality of content providers having respective prespecified delivery parameters, wherein a respective delivery parameter is specified by a respective content provider and the user is required to receive or be available to receive communications from at least one of said plurality of content providers, said communications management system being further arranged to manage delivery of communications to the user based on the identified prescribed delivery parameter.

16. The system of claim 15, wherein said determining system is a home location register.

17. The system of claim 15, wherein said determining system is arranged to determine whether the user is using a home communications network or a roaming network, said communications management system being arranged to manage delivery of communications to the user based on whether the user is using a home communications network or a roaming network.

18. The system of claim 15, wherein said determining system is arranged to determine a country in which the user is situated when using a roaming network, said communications management system being arranged to manage delivery of communications to the user based on the country in which the user is situated when using the roaming network.

19. The system of claim 15, wherein said determining system is arranged to determine an operator of the roaming network being used by the user when the user is using a roaming network, said communications management system being arranged to manage delivery of communications to the user based on the operator of the roaming network being used by the user when the user is using a roaming network.

20. The system of claim 15, wherein said database further includes at least one user-determined delivery preference relating to delivery of communications, said communications management system being arranged to manage delivery of communications to the user based on the communications network being used by the user and the at least one user-determined delivery preference.

21. The system of claim 20, further comprising an interface for enabling the user to interface with said database and manage the at least one user determined delivery preference.

22. The system of claim 20, wherein said at least one user-determined delivery preference includes preferences relating to a list of different communication sources from which the user could receive communications and preferences relating to a list of different communication types which the user could receive.

23. The system of claim 20, wherein said communications management system includes a secondary communications management system arranged to manage communications to the user, said secondary communications management system being arranged to receive communications intended for the user, data from the database about the at least one user-determined delivery preference and data about the communications network being used by the user from said determining system, to determine whether the communications should be delivered to the user, and if so, to control a communications network element to deliver the communications to the user.

24. The system of claim 23, wherein said secondary communications management system is arranged to receive an indication of the sender and recipient of communications and optionally the communications via the communications network element.

25. The system of claim 15, wherein said communications management system includes tools which enable each of the plurality of contents providers to define rules of controlling delivery of said communications.

26. The system of claim 15, further comprising resource usage determining means coupled to said communications management system, said resource usage determining means being arranged to receive data identifying the communications network being used by the user and to levy resource usage requirements at a first rate for a communication delivered to a user using the home communications network and at a second rate when the user is using a roaming network, wherein said second rate is different from said first rate.

27. The system of claim 15, wherein the content delivered to the user comprises at least one of an SMS message, an MMS message, a WAP push message, a data call, a voice call, a video call, music streaming, video streaming, an advertising message, and a marketing message.

28. The system of claim 15, wherein the available usage corresponds to monetary resources of the at least one of the plurality of content providers for delivery of communications to the user.

* * * * *

UNITED STATES PATENT AND TRADEMARK OFFICE
CERTIFICATE OF CORRECTION

PATENT NO. : 7,577,433 B2 Page 1 of 1
APPLICATION NO. : 12/080940
DATED : August 18, 2009
INVENTOR(S) : Timo Ahopelto It is certified that error appears in the above-identified patent and that said Letters Patent is hereby corrected as shown below:

On the Title page:

Below item (65) Priority Publication Data:

Insert Item --(30) Foreign Application Priority Data

Nov. 8, 2007 (GB)............0721921.5--.

Signed and Sealed this

Sixth Day of October, 2009

David J. Kappos
*Director of the United States Patent and Trademark Office*